United States Patent [19]

Alexander, Jr.

[11] Patent Number: 5,779,289
[45] Date of Patent: Jul. 14, 1998

[54] WATER FILLED BALLASTED TRACTOR BUMPER ASSEMBLY

[76] Inventor: William Haston Alexander, Jr., P.O. Box 267, Sheffield, Ala. 35660

[21] Appl. No.: 654,540

[22] Filed: May 29, 1996

[51] Int. Cl.⁶ .................................. B60R 19/52
[52] U.S. Cl. .................. 293/106; 293/115; 293/146; 280/759
[58] Field of Search .................. 293/106, 107, 293/115, 117, 146; 280/759

[56] References Cited

U.S. PATENT DOCUMENTS

| | | | |
|---|---|---|---|
| 1,486,222 | 9/1924 | Berry | 293/106 |
| 1,784,387 | 12/1930 | Postel | 293/107 X |
| 2,537,553 | 1/1951 | Schonauer | 293/115 X |
| 2,779,620 | 1/1956 | Reed . | |
| 3,490,787 | 1/1970 | Latterman et al. | 293/117 |
| 3,501,190 | 3/1970 | McCrea | 293/107 X |
| 3,512,795 | 5/1970 | Naeve . | |
| 3,512,822 | 5/1970 | Rich et al. | 293/107 |
| 4,902,059 | 2/1990 | Tritton | 293/117 |

FOREIGN PATENT DOCUMENTS

| | | | |
|---|---|---|---|
| 8024380 | 4/1989 | Australia | 293/107 |
| 3518899 | 11/1986 | Germany | 293/117 |

*Primary Examiner*—Dennis H. Pedder
*Attorney, Agent, or Firm*—Laurence R. Brown

[57] ABSTRACT

A front end bumper assembly for tractors is constructed from hollow steel fluid reservoir tanks for providing ballast. The bumper assembly has an upper grille for protecting the nose-radiator region of the tractor and two spaced lowermost horizontally disposed bumper arms. The bumper assembly is attached to a tractor by a bracket assembly at a location below the center of gravity of the tractor to concentrate the bumper weight for bearing upon front steering wheels for better traction and steering.

10 Claims, 2 Drawing Sheets

5,779,289

WATER FILLED BALLASTED TRACTOR BUMPER ASSEMBLY

TECHNICAL FIELD

This invention relates to front end tractor bumpers and more particularly it relates to ballast carrying tractor bumpers.

BACKGROUND ART

Various front end tractor bumper configurations have been proposed in the prior art. In this respect weight supplemented front bumpers are well known for providing ballast. In general these bumpers have added shaped steel configurations attached to a bumper assembly as accessories. Bumper features specifically fashioned for tractors are well known in the art, such as shown in U.S. Pat. No. 2,779,620, Jan. 29, 1957 to K. D. Reed for Bumper, Grill and Pan Guard, in which a bracket affixes a bumper grillwork assembly in front of the tractor, which extends from below the chassis upwardly to protect the radiator or nose region.

Upon such bumpers ballast members of various sorts have been proposed, usually heavy iron weights of various form attached to a bumper assembly by mounting structure. The prior art ballasting structure adds significant cost and complexity to bumper arrays and introduces bumper shapes and constructions that can snag brush, bend or break if contacting a large rock slightly above ground level, or otherwise interfere with desired tractor usage. Another problem with these ballasted bumpers is that the added steel weights must be attached with brackets and bolts, producing an assembly likely to rust and need maintenance, and which during manufacture is costly and apt to produce weakened bumper structure due to disposition of accessory mounting holes in strategic locations on load bearing bumper parts.

One accessory proposal has been made to add a supplemental fuel tank to the forward nose of the tractor as ballast: G. E. Naeve, U.S. Pat. No. 3,512,795, May 19, 1970 entitled Auxiliary Fuel Tank for a Tractor. Various problems exist from this kind of ballast structure, since the fuel tank is apt to be damaged by hitting a wall or tree, and the ballast provided is not effective because of the tank position and the variable level of fuel in the tank.

Spare fuel and water is carried in a light weight automobile bumper pipe in U.S. Pat. No. 1,486,222, Mar. 11, 1924 by I Berry for Bumper. In another automobile bumper U.S. Pat. No. 3,512,822, May 19, 1970 to J. W. Rich, et al. for Combination Liquid and Metal Shock Absorbing Buffers, resilient water filled tanks serve as deformable shock absorbers for absorbing impact energy from high speed collisions. However the functional requirements for automobile bumpers are not suitable for use on tractors. For example, shock absorption is not particularly a desirable feature for lower speed, higher powered tractors, and thus shock absorbing bumpers would be replaced by other more necessary functional features such as ruggedness in the presence of industrial and farming type usage which protects tractor structure, and long life upon impacts without bumper damage.

In general the needs for bumpers on tractors and automobiles are significantly different because of large rear drive wheels on tractors and powerful engines geared for low speed turning of large diameter rear tractor wheels, which produces torque problems even with a heavy front end engine that can cause loss of control of front wheel steering under heavy power conditions such as plowing. Such torque problems have evolved the need for heavy ballast weights, usually carried in the front bumper array to counteract this torque.

This invention is directed to improvements in ballasted front tractor bumper assemblies, with introduction of novel bumper structure which overcomes the problems of the prior art and provides significant operating advantages for tractors, and permits low cost construction of heavy ballasted bumper assemblies that can provide bumper strength and construction simplicity well suited to tractor duties.

DISCLOSURE OF THE INVENTION:

A front end bumper assembly for tractors has a heavy duty bumper array comprising hollow steel fluid reservoir tanks of heavy gauge steel plate having a capacity that when filled with water provides significant weight from supplemental low cost ballast without corresponding disadvantages and higher cost caused by added steel weights attached to tractor bumper structure in the manner suggested by the prior art.

The preferred bumper structure embodiment thus comprises a lowermost ballast-bumper hollow bar array formed of welded heavy gauge steel plate forming a wider upper bumper bar, and narrower lower bumper bar across the front end of the tractor, with vertically extending grillwork for protection of the tractor nose end and radiator area. Thus the tractor with the bumper assembly can push various structures, such as heavy timber, vehicles, stones, utility steel trays and trash vehicles, and the like. Because of the additional water ballast of a weight of about 62 pounds per cubic foot, a bumper tank can introduce heavy ballast loads for improving steerability from the front wheels.

Other structural and operations features and advantages of the invention will be found throughout the following description, claims and appended drawings.

BRIEF DESCRIPTION OF THE DRAWINGS:

In the accompanying drawings wherein like reference characters throughout the various views identify similar features to facilitate comparison.

Figure 1:
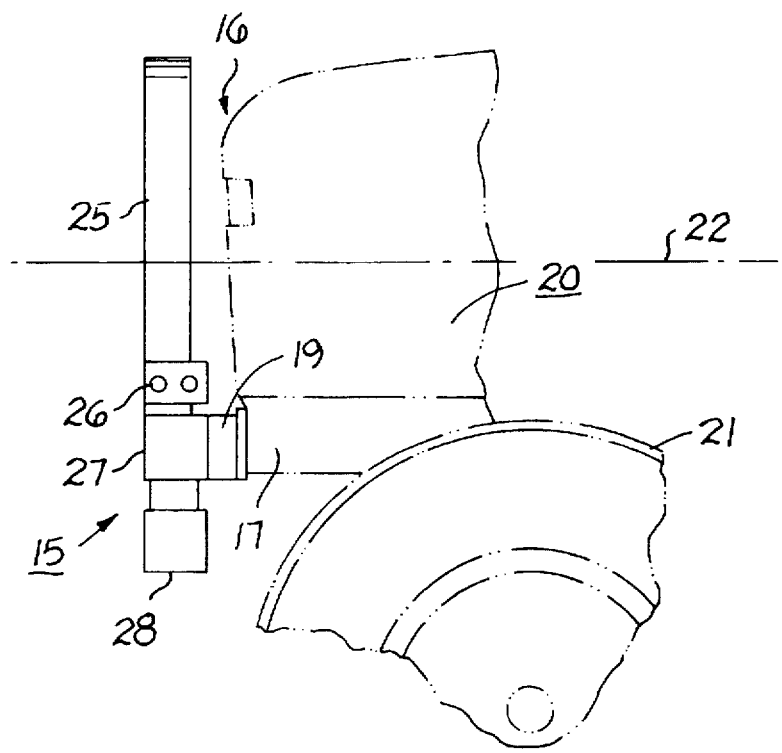
FIG. 1 is a fragmental side view of a tractor-bumper assembly with the novel ballasted bumper afforded by this invention being attached to the nose end of the tractor.

THE PREFERRED EMBODIMENT:

As may be seen from FIG. 1, a ballasted bumper array 15 is attached at the front tractor nose end 16 to the frame 17 of tractor 20 by bracket 19. The bumper array construction is typically of welded heavy gauge sheet steel having considerable weight, which serves as ballast for the tractor front end for keeping steering wheels 21 firmly in contact with the ground. By disposing the entire bumper weight on the front of the tractor ahead of the wheels 21 at a frame 17 position well below the center of gravity 22 of the tractor by way of bracket 19, the ballasting effect is maximized with respect to any torque produced by rear drive wheels tending to lighten the weight upon the steering wheels 21.

The bumper array comprises an upper nose and radiator protection grill 25, typically bolted at 26 to the lower pair of bumpers 27, 28 positioned to contact or abut and push objects including vehicles, trays, trash bins, trees, and the like. Both the upper and lower bumper arms 27, 28 are disposed in front of the wheels 21 as a protective barrier.

Figure 2:
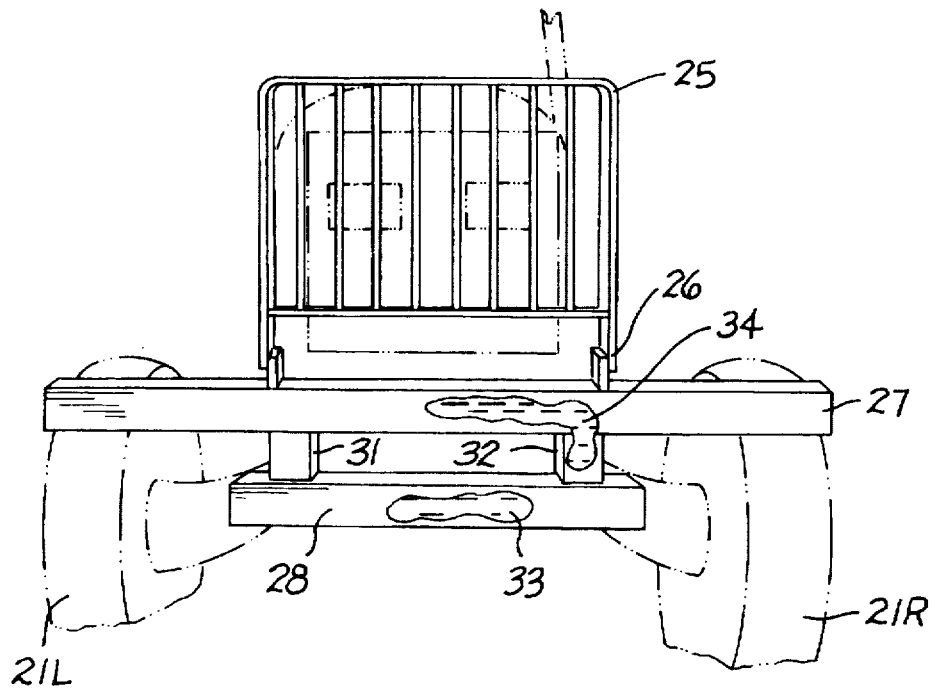
FIG. 2 is a front view of the tractor-bumper assembly with the bumper shown partly broken away.

In the front view of FIG. 2, it is seen that the upper bumper arm 27 extends across the width of the wheel span, and the lower bumper arm 28 is disposed low enough to contact any obstacles that might be carried underneath and damage the tractor carriage. The two bumper arms are connected together as a unit by way of the vertical columnar members 31, 32. The bumper members 27, 28, 31 and 32 in accordance with this invention are constructed as hollow liquid storage tanks, as illustrated at the cutaways 33, 34, for filling with liquid, usually water with accompanying antifreeze. Thus, the hollow bumper tanks are made of inexpensive standard heavy gauge steel plate welded to form a liquid storage tank. The water is an inexpensive ballast additive that neither disfigures the bumper profile, nor requires mounting brackets which might interfere with brush or snaggle onto something in the tractor's path. Accordingly the simple, smooth and effective bumper structure in the shape of a closed bottom π (pi) will not likely damage objects being pushed and requires no maintenance in attaching, fastening, adjusting, tightening or cleaning the typical prior art shaped steel weights used as bumper ballast accessories.

If two bumper arms having an internal tank height of eight inches and width of five inches extending about nine feet along a five foot upper bumper arm length, a three foot lower bumper arm length with two six inch vertical connector columns, about 2.5 cubic feet of water capacity would add 155 pounds of ballast. Of course the dimensions may vary for different tractors and ballast needs.

Figure 3:
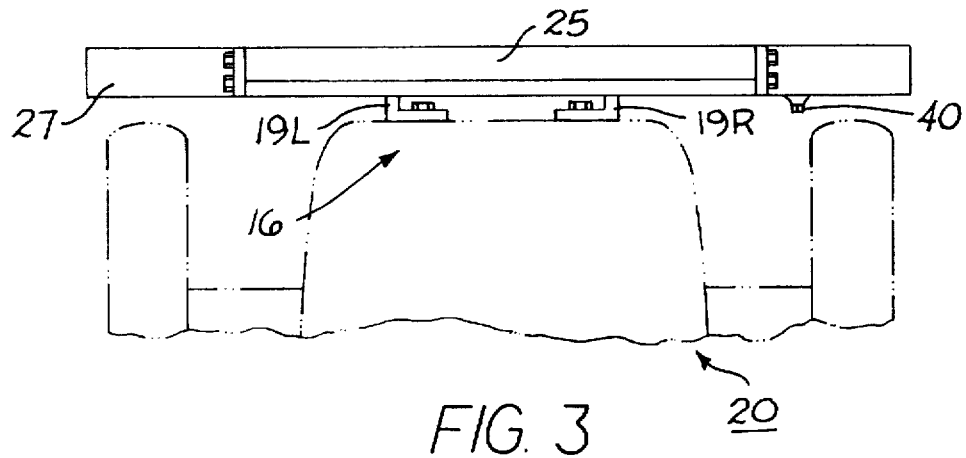
FIG. 3 is a fragmental top view of the tractor-bumper assembly.
Figure 4:
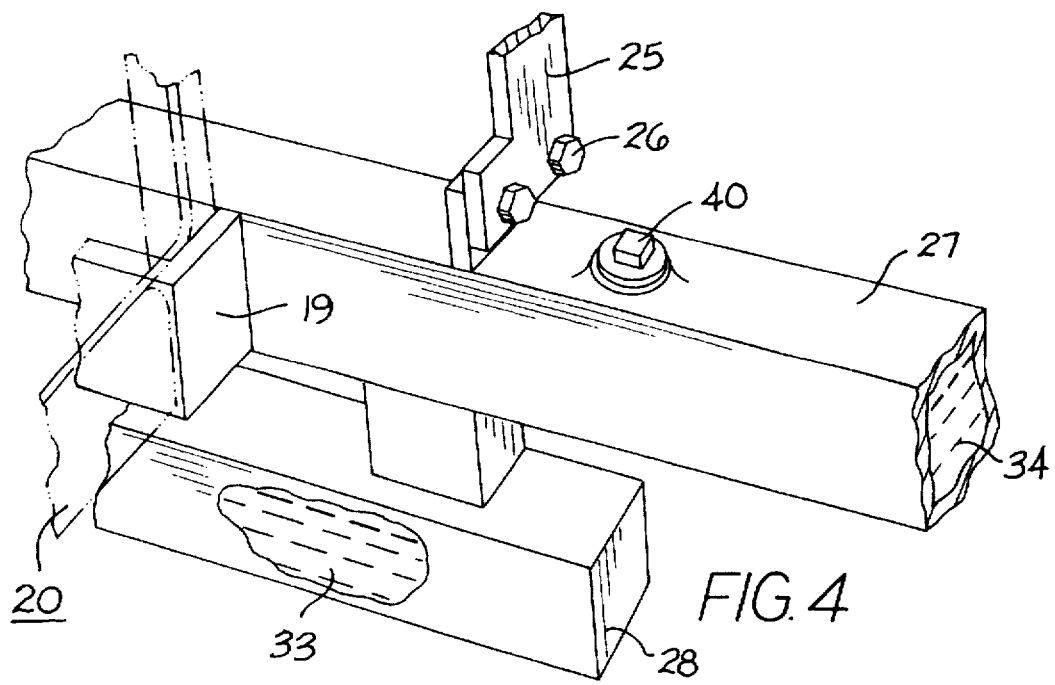
FIG. 4 is an enlarged fragmental, partly broken away view of a bumper embodiment of the invention in perspective.

As may be seen in the top view of FIG. 3 and the enlarged view of FIG. 4, there is a bung with screw plug 40 disposed on the inner surface facing the tractor 20, near the top of the upper bumper arm 27 for filling the hollow bumper tank structure with ballast water as indicated at 33, 34.

Figure 5:
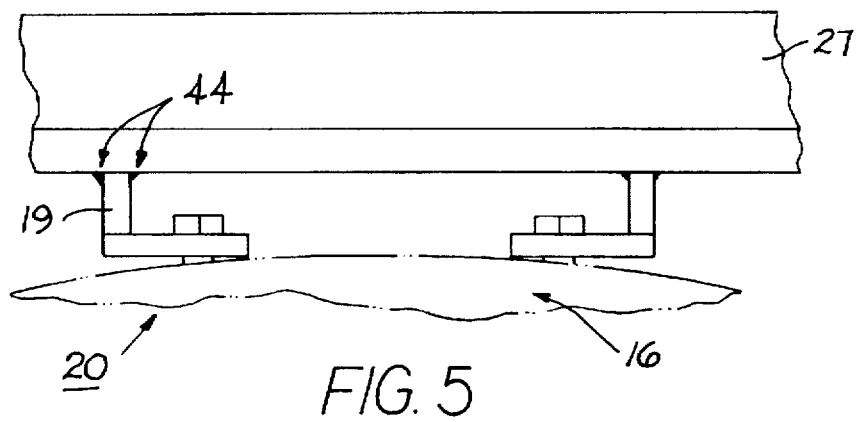
FIG. 5 is an enlarged fragmental top view showing the bumper attached to the nose end of a tractor.

The bracket attachment 19, welded at 44 onto the bumper arm 27, is shown in FIGS. 3 and 5. The positioning may vary with different tractors 20, to provide the most stable mount to the tractor frame, generally with the brackets 19 spaced as far apart as feasible on the bumper arm 27.

It is therefore evident that this invention provides a novel and improved ballasted bumper for tractors, and thus the features of novelty setting forth the spirit and nature of the invention are set forth with particularity in the following claims.

I claim:

1. A ballasted front bumper assembly for a tractor comprising in combination:

bracket means for mounting a bumper assembly at a position in front of a tractor for adding enough ballast weight for counteracting tractor torque tending to reduce front wheel steering contact with the ground, and a bumper positionable by said bracket means for the additional function of producing said ballast weight, said bumper comprising a housing member for positioning by said bracket means, said housing member comprising a hollow closed tank body defining a fluid reservoir tank for receiving and confining internally therein a fluid to function as supplemental ballast within the housing member.

2. The bumper assembly defined in claim 1, wherein said housing member and said bracket are relatively positioned to extend said hollow housing member at least partly below a horizontal center of gravity plane of a tractor.

3. The bumper assembly defined in claim 1 wherein said hollow body comprises upper and lower horizontal crossbars interconnected by at least two vertical column members.

4. The bumper assembly defined in claim 1 further comprising a grillwork assembly positioned to protect a tractor radiator extending vertically from the hollow body.

5. The bumper assembly defined in claim 4 wherein said hollow body further comprises structure horizontally disposed underneath the grillwork assembly transverse to the tractor for disposal substantially into a region in front of a pair of steerable front tractor wheels.

6. The bumper assembly defined in claim 1 further comprising mounting structure supplied solely by said bracket means for disposing the entire bumper weight at the front end of a tractor ahead of a set of steering wheels at a frame position below the center of gravity of the tractor.

7. The bumper assembly defined in claim 1 further comprising a longer upper arm and shorter lower arm horizontally disposed in spaced relationship and interconnected by two spaced vertical arms, said arms being hollow and constituting a fluid-tight said reservoir tank.

8. The bumper assembly defined in claim 1 wherein the bumper further consists of a single unit bumper configuration of interconnected upper and lower bumper arms with a smooth outer skin surface from which said bracket means protrudes from the rear.

9. A heavy duty ballast bumper assembly attached to a tractor front end for ballast to keep front tractor wheels in traction on the ground comprising a structure made of welded steel plate shaped to constitute two horizontally disposed vertically spaced bumper rods disposed substantially below a center of gravity for the attached tractor, said bumper assembly being of a weight substantially contributing to counteract tractor torque tending to raise the front tractor wheels by ballasting a set of front steering wheels into firm contact with the ground.

10. A bumper assembly as defined in claim 9 wherein said bumper rods are hollow and constructed as a reservoir tank to confine a liquid charge for increasing the ballast weight of the bumper assembly.

* * * * *